(12) United States Patent
Mehrotra et al.

(10) Patent No.: US 12,445,864 B2
(45) Date of Patent: Oct. 14, 2025

(54) OPTIMIZED X2 CELL REPORTING

(71) Applicant: Parallel Wireless, Inc., Nashua, NH (US)

(72) Inventors: Shivani Mehrotra, Nashua, NH (US); Mahendra Singh Rajput, Bangalore (IN)

(73) Assignee: Parallel Wireless, Inc., Nashua, NH (US)

( * ) Notice: Subject to any disclaimer, the term of this patent is extended or adjusted under 35 U.S.C. 154(b) by 552 days.

(21) Appl. No.: 17/750,030

(22) Filed: May 20, 2022

(65) Prior Publication Data

US 2022/0377578 A1 Nov. 24, 2022

Related U.S. Application Data

(60) Provisional application No. 63/190,850, filed on May 20, 2021.

(51) Int. Cl.
*H04W 24/02* (2009.01)
*H04W 24/10* (2009.01)
*H04W 92/20* (2009.01)

(52) U.S. Cl.
CPC ........... *H04W 24/02* (2013.01); *H04W 24/10* (2013.01); *H04W 92/20* (2013.01)

(58) Field of Classification Search
None
See application file for complete search history.

(56) References Cited

U.S. PATENT DOCUMENTS

| 8,879,486 | B2 * | 11/2014 | Nylander | ............ | H04L 61/4511 |
| | | | | | 370/395.2 |
| 9,900,407 | B2 | 2/2018 | Mishra et al. | | |
| 10,595,242 | B2 | 3/2020 | Rao et al. | | |
| 10,798,631 | B2 | 10/2020 | Agarwal et al. | | |
| 10,959,275 | B2 | 3/2021 | Mishra et al. | | |
| 2012/0002537 | A1 * | 1/2012 | Bao | ....................... | H04W 24/04 |
| | | | | | 370/221 |

FOREIGN PATENT DOCUMENTS

KR 20160130373 A * 11/2016 ............ H04W 48/16

OTHER PUBLICATIONS

LTE; Evolved Universal Terrestrial Radio Access (E-UTRA) and Evolved Universal Terrestrial Radio Access Network (E-UTRAN); Overall description; Stage 2 (3GPP TS 36.300 version 12.3.0 Release 12), Sep. 2014.
LTE; Evolved Universal Terrestrial Radio Access Network (E-UTRAN); X2 Application Protocol (X2AP) (3GPP TS 36.423 version 12.3.0 Release 12), Sep. 2014.

(Continued)

*Primary Examiner* — Adolf Dsouza
(74) *Attorney, Agent, or Firm* — Michael Y. Saji (57) ABSTRACT

Methods, systems and computer readable media are disclosed for providing optimized X2 cell reporting. A method includes selecting a subset of virtualized BaseBand Units (vBBU) vnodes to a macro peer that have either reported the X2 peer eNB as a neighbor, or host a cell that the X2 peer eNodeB (eNB) has reported as a neighbor while advertising the neighboring cells towards macro; and advertising cells of this subset of vBBU vnodes as served-cells in X2-Setup Request/Response towards a macro.

15 Claims, 8 Drawing Sheets

(56) References Cited

OTHER PUBLICATIONS

LTE; Evolved Universal Terrestrial Radio Access Network (E-UTRAN); S1 Application Protocol (S1AP) (3GPP TS 36.413 version 15.3.0 Release 15), Sep. 2018.
LTE; Evolved Universal Terrestrial Radio Access Network (E-UTRAN); X2 signalling transport (3GPP TS 36.422 version 12.0.0 Release 12), Sep. 2014.

* cited by examiner

OPTIMIZED X2 CELL REPORTING

CROSS-REFERENCE TO RELATED APPLICATIONS

This application claims priority under 35 U.S.C. § 119(e) to U.S. Provisional Pat. App. No. 63/190,850, filed May 20, 2021, titled "Optimized X2 Cell Reporting" which is hereby incorporated by reference in its entirety for all purposes. This application also hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety.

BACKGROUND

X2GW is an entity at EUTRAN architecture to aggregate the X2-C interface across (H) eNodeBs (eNBs). The eNBs register with the X2 node at power on or after any change of Transport Network Layer (TNL) address(es). X2AP signaling protocol defined via 3GPP 36.423 provides peer to peer connectivity between eNodeB's. This direct connection between eNodeB's is utilized for Mobility as well as MRO (Mobility Robustness Optimization) and MLB (Mobility Load Balancing) functionalities. With HNG sitting on the edge of network talking directly to eNodeB's, X2GW has been developed on HNG to facilitate communication with eNodeB's on access and Core side over X2AP. The HNG may also be referred to as a coordination server.

SUMMARY

X2GW on a HetNet Gateway (HNG) supports the following: X2 Messaging between Inter/Intra-HNG VeNB; X2 Messaging between Access HeNB and Core Macro eNodeB; and X2 Messaging between Converged Wireless System (CWS) and HNG for ICIC X2GW on HNG allows inter-operability between multi-vendor eNodeB's along with VeNB aggregation where 256 HeNB/CWS sharing the common 20 bit global eNodeB ID are virtualized as single VeNB towards Core network (MME)/Macro eNodeB.

In the configuration where multiple eNBs are managed at one aggregation node, such as an HNG, and where the HNG has an X2 connection with another neighboring macro eNB, any update messages may be also sent to the macro eNB, including updates that do not relate to cells that are near the macro eNB. This is undesirable as it is unnecessary to broadcast any, or every, cell addition, deletion, or modification within the HNG's aggregation group to the neighboring macro eNB.

A system is disclosed to enhance HNG X2GW node in a manner which would optimize the mechanism to advertise virtualized served cells towards macro eNB. This will enable informing the subset of virtualized cells which are detected by third party Macro as a neighbor, when Macro initiates the X2 connection. Also, when cell belonging to subset of cells i.e. sub macro at HNG detects cell served by Macro as a neighbor, HNG informs only a subset of cells towards macro instead of all served cells.

This will help in reducing the significant network load and optimize the bandwidth on control plane by minimizing the unwanted X2 connections among the VRUs connected to HNG and macro. It will also improve the performance of the nodes by reducing the processing time required for encoding and decoding of multiple served cells reported to Macro eNodeB.

A method is disclosed for or optimized X2 cell reporting In one embodiment the method may include selecting a subset of virtualized BaseBand Units (vBBU) vnodes to the macro peer that have either reported the X2 peer eNB as a neighbor or host a cell that the X2 peer eNodeB (eNB) has reported as a neighbor while advertising the neighboring cells towards macro; and advertising cells of this subset of vBBU vnodes as served-cells in X2-Setup Request/Response towards a macro.

In another example embodiment a system providing optimized X2 cell reporting, includes a plurality of vBBUs; a plurality of eNodeBs (eNBs), each eNB in communication with a vBBU; a HetNet Gateway (HNG) in communication with the plurality of vBBUs; wherein a subset of virtualized BaseBand Units (vBBU) vnodes are selected to a macro peer that have either reported the X2 peer eNB as a neighbor, or host a cell that the X2 peer eNodeB (eNB) has reported as a neighbor while advertising the neighboring cells towards macro; and wherein cells of this subset of vBBU vnodes are advertised as served-cells in X2-Setup Request/Response towards a macro.

In another example embodiment a non-transitory computer-readable medium contains instructions for operating a wireless network system providing optimized X2 cell reporting, which, when executed, cause the system to perform steps including selecting a subset of virtualized BaseBand Units (vBBU) vnodes to a macro peer that have either reported the X2 peer eNB as a neighbor, or host a cell that the X2 peer eNodeB (eNB) has reported as a neighbor while advertising the neighboring cells towards macro; and advertising cells of this subset of vBBU vnodes as served-cells in X2-Setup Request/Response towards a macro.

DETAILED DESCRIPTION

Figure 1:
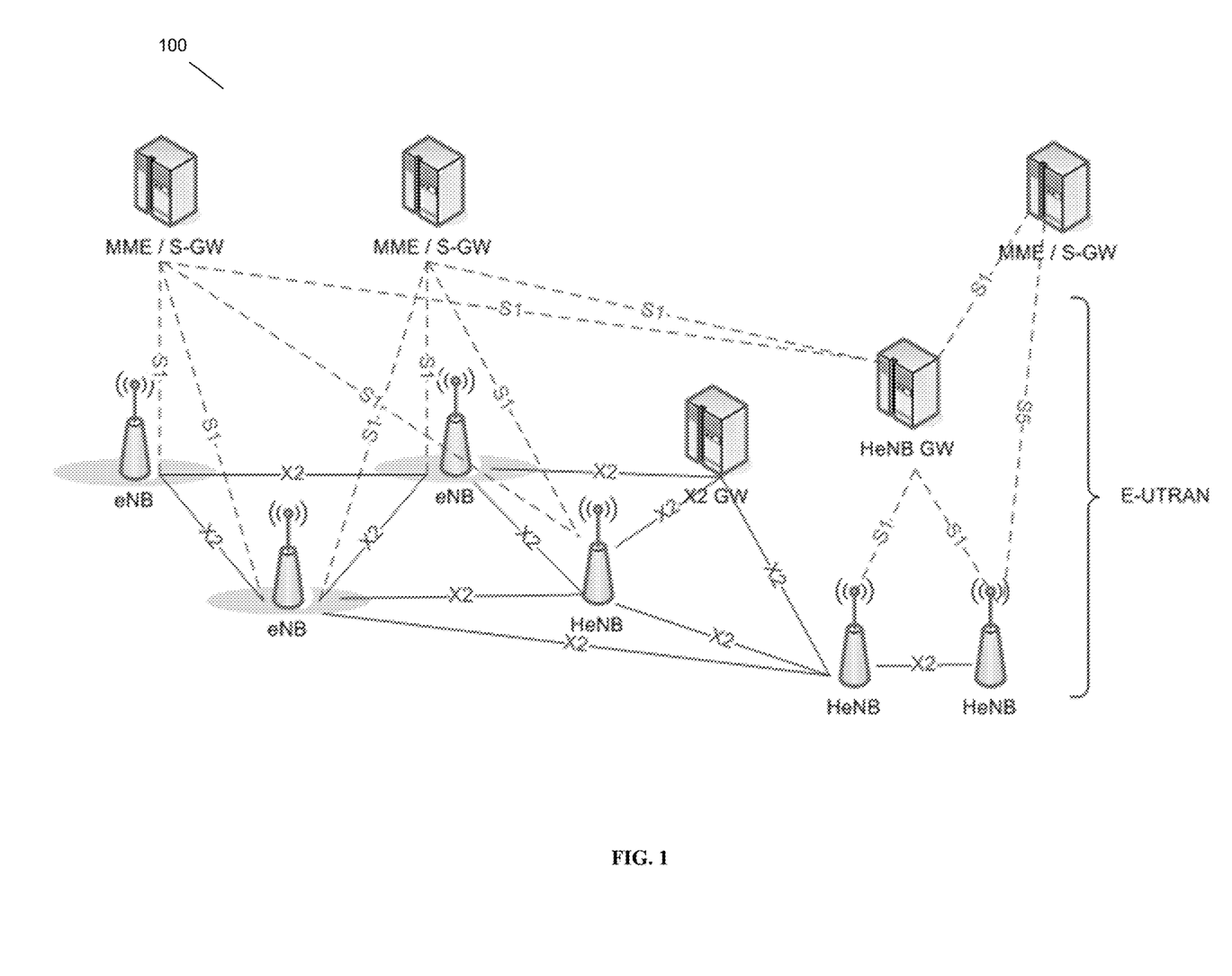
FIG. 1 is a system diagram of an Evolved Packet Core architecture, in accordance with some embodiments.

FIG. 1 is a system diagram of an wireless communication network architecture 100. The network includes a variety of eNobeBs, HeNBs, gateways and MMEs in wireless communication.

Figure 2:
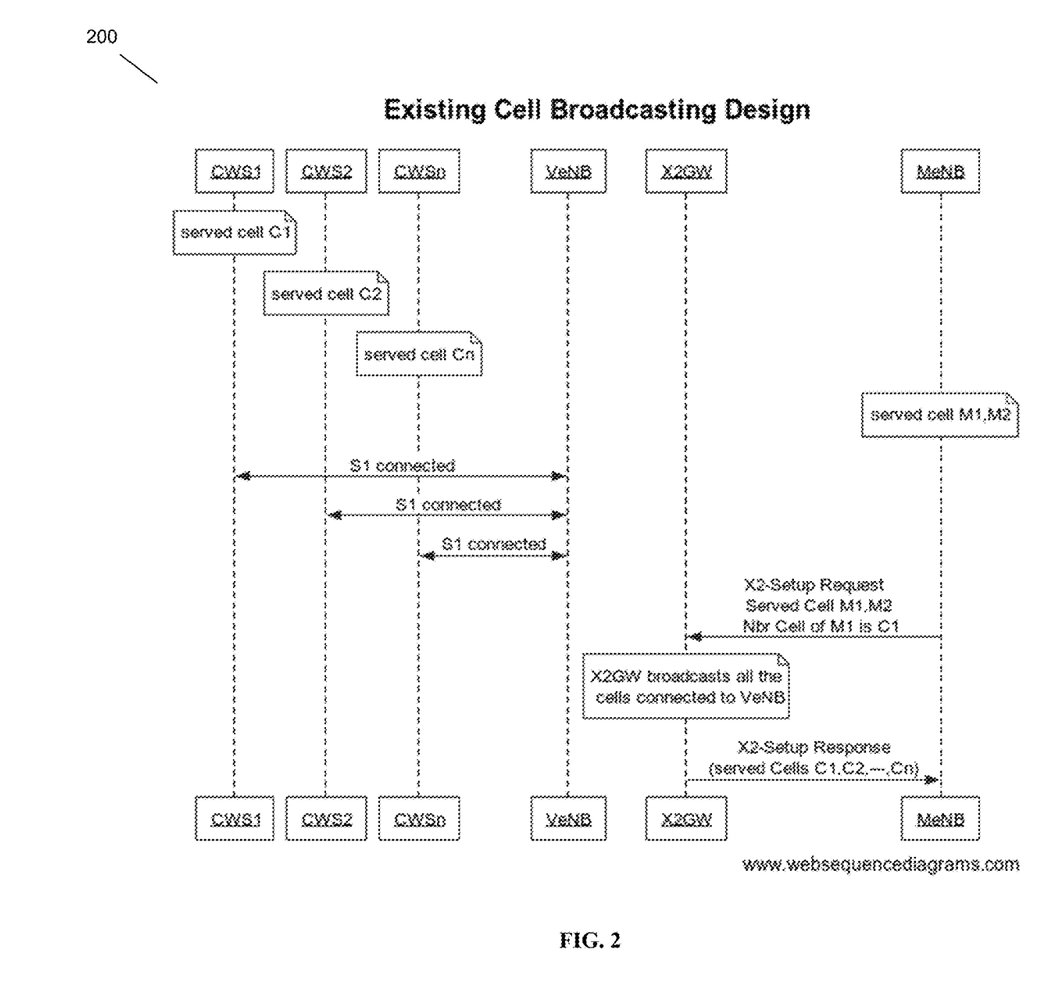
FIG. 2 is a diagram of an X2-setup call flow for cell broadcasting, in accordance with some embodiments.

FIG. 2 shows a X2-setup call flow 200. If any CWS/HeNB is connected to this VeNB after X2 association is established with Macro, all the cells belonging to those are reported on the existing X2 association. Since VeNB is capable of virtualizing up to 256 cells, this design results in possible unwanted messages being sent over the network and extra processing at both X2GW and Macro nodes.

Solution to Problem

The idea presented in this document defines an approach to advertise the correct subset of cells to Macro and optimize the control plane signaling over X2 interface.

Existing released PW eNodeB products support a single LTE cell. However, the new eNodeB products, vBBU provide support for more than one cell enabling HNG to virtualize subset of cells(per vBBU).

Figure 3:
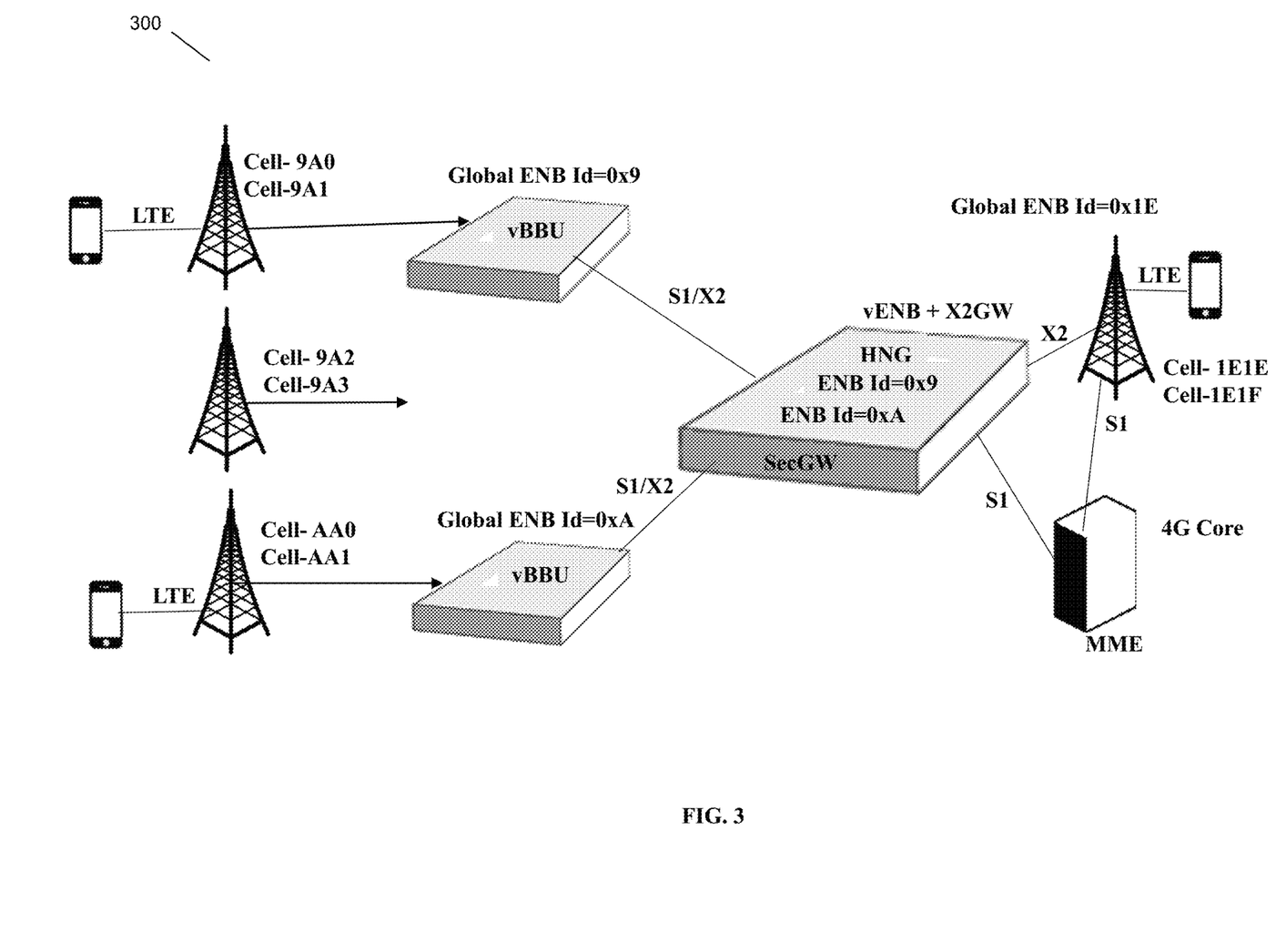
FIG. 3 is a system diagram of an HNG architecture with multi-cell vBBU, in accordance with some embodiments.

FIG. 3 shows an HNG architecture with Multi-Cell vBBUs 300.

The approach suggested here utilizes this multicell feature support to optimize the cell advertising approach.

HNG shall now store the virtualized cells as subsets of cells belonging to each vBBU.

While advertising the neighboring cells towards Macro, X2GW will select the subset of vBBU vnodes to the macro peer that have either reported the X2 peer eNB as neighbor (for example, when the cell joins the neighborhood) or host a cell that the X2 peer eNB has reported as neighbor.

In some embodiments, all cells of this subset of vBBU vnodes are then advertised as served-cells in X2-Setup Request/Response towards macro. This will ensure that only the correct subset of cells is reported to Macro as served cells.

Subsets can be CWSes or VRUs. Subsets can be based on the cells that belong to a particular VRU. Subsets can be a specific set of cells identified by a macro peer.

This approach will also save on significant L5, L4, L3 and L2 processing for the X2AP messages required to be sent/received on X2 interface for reporting unwanted cell changes belonging to VRU/CWS nodes which neither identify Macro as their neighbor nor are identified by Macro.

As a result, it will decrease network load as well as processing on both HNG and Macro nodes, thus increasing the overall system performance.

In some embodiments, VRUs (virtual radio units) may be supported. VRUs can support four cells within a single RAT, or more.

Figure 4:
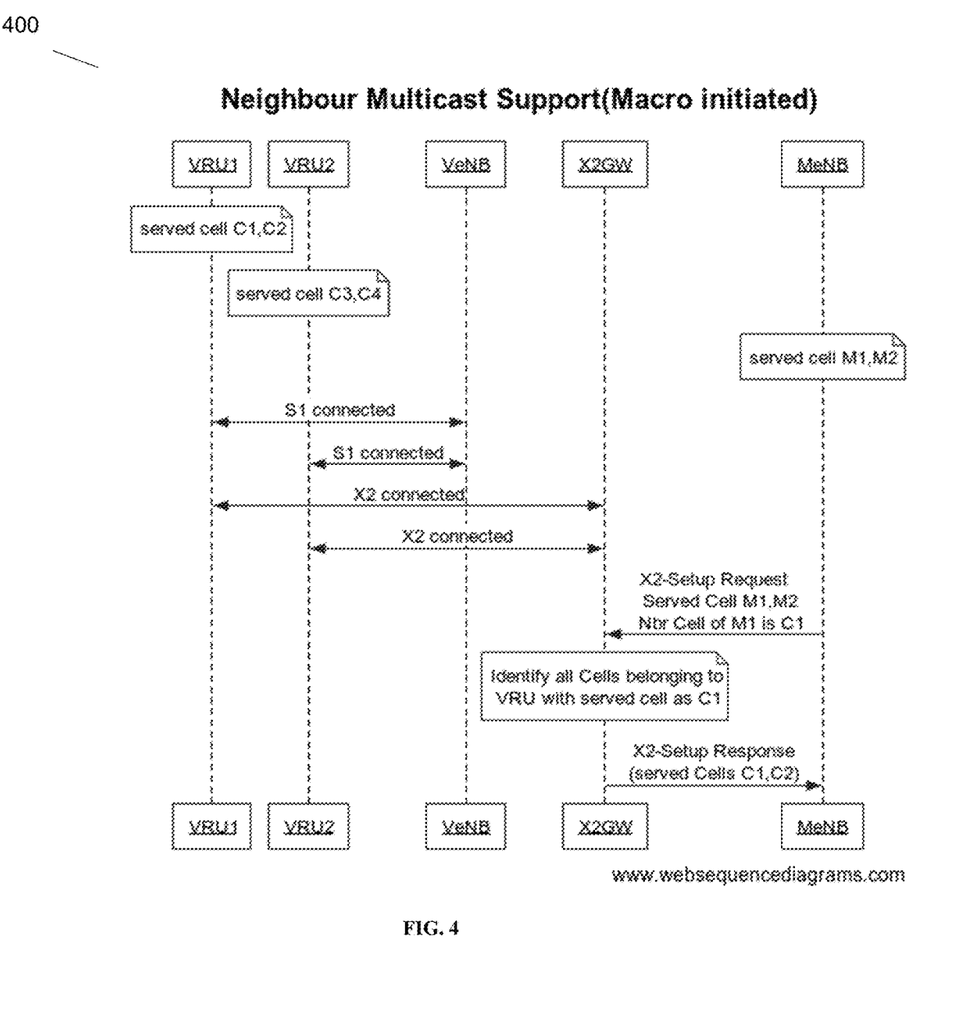
FIG. 4 is a diagram of a call flow for a neighbor multicast support which is macro initiated, in accordance with some embodiments.

FIG. 4 shows a call flow for a Macro initiated X2 setup 400. Here since MeNB reported only cell C1 as neighbor cell, only cells of VRU hosting C1 shall be reported to this Macro (VRU2 shall not be reported).

Figure 5:
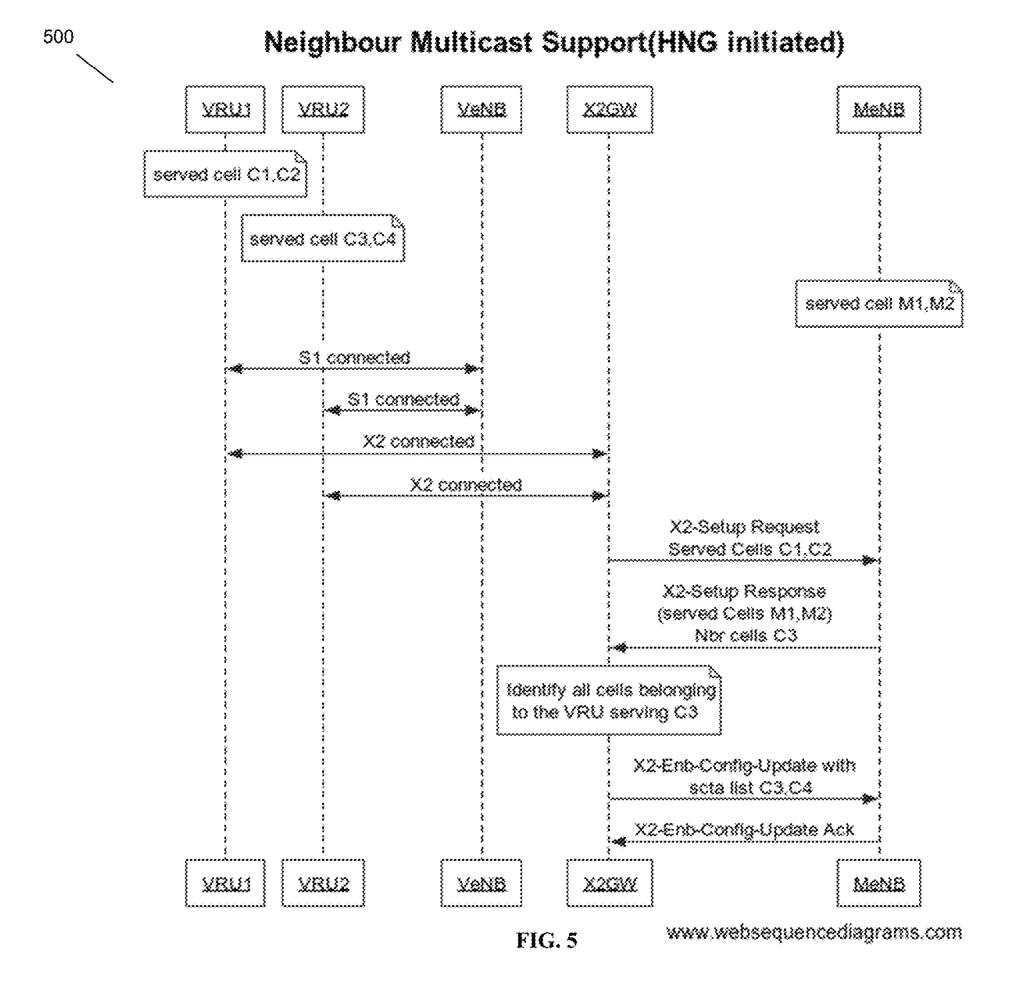
FIG. 5 is a diagram of a call flow for a neighbor multicast support which is HNG initiated, in accordance with some embodiments.

FIG. 5 shows a call flow for an HNG initiated X2 setup 500. Once X2 connection is established between HNG and macro, only cells belonging to vBBU that wither report Macro cell as neighbor or host cells reported by Macro as neighbor are reported.

A new CLI is added to describe the behavior to advertise served cells towards macro eNB.

CLI syntax:
C7X2gwDevl# config
Entering configuration mode terminal

```
C7X2gwDev1(config)# profiles venb-profile venb_prof
C7X2gwDev1(config-profiles-venb-profile-venb_prof)#
x2ap-served-cells
```

Possible completions:
all-cells—Advertise All Cells of Connected vBBU Nodes sharing the same vENB
neighbors-only—Advertise Cells of vBBU Nodes that have detected the peer as a neighbor or the peer has indicated via X2 that one more of the vBBU cells is a neighbor.

```
C7X2gwDev1(config-profiles-venb-profile-venb_prof)#
x2gw-served-cells all-cells
    C7X2gwDev1(config-profiles-venb-profile-venb_prof)# end
    C7X2gwDev1#
``` all-cells: If this option is configured, all cells from all the connected vBBU Nodes are advertised as served-cells in X2-Setup Request/Response towards macro.
neighbors-only: If this option is configured, a subset of vBBU vnodes is selected that have either reported the X2 peer eNB as neighbor or host a cell that the X2 peer eNB has reported as neighbor. All cells of this subset of vBBU vnodes are then advertised as served-cells in X2-Setup Request/Response towards macro.

If no neighbor is found, all cells from all the connected vBBU Nodes shall be advertised.

HNG's X2GW node interfacing with the multi-cell vBBU nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

5G is the next generation Mobile Communication technology following the 4G/LTE. 3GPP has been working on defining the standards for 5G as part of 3GPP Rel 15 and 16. Starting 1G and then followed by 2G, 3G and 4G, each generation has the laid the foundation for the next generation in order to cater to newer use cases and verticals. 4G was the first generation that introduced flat architecture with all-IP architecture. 4G enabled and flourished several new applications and use case. 5G is going to be not just about higher data rates but about total user experience and is going to cater to several new enterprise use cases like Industrial automation, Connected Cars, Massive IOT and others. This will help operators to go after new revenue opportunities.

Launching 5G network will need significant investment as it will need RAN and Packet Core upgrade. 3GPP has defined a new 5G NR and new 5G Core. Eventually all the operators will want to head towards a complete 5G network coverage with the new 5G Standalone Core, given the several new features and capabilities that the new 5G Standalone network brings in. But given the significant cost involved, 3GPP has defined number of different intermediate solutions that can provide gradual migration from current 4G network to the eventual native 5G network.

The protocols described herein have largely been adopted by the 3GPP as a standard for the upcoming 5G network technology as well, in particular for interfacing with 4G/LTE technology. For example, X2 is used in both 4G and 5G and is also complemented by 5G-specific standard protocols called Xn. Additionally, the 5G standard includes two phases, non-standalone (which will coexist with 4G devices and networks) and standalone, and also includes specifications for dual connectivity of UEs to both LTE and NR ("New Radio") 5G radio access networks. The inter-base station protocol between an LTE eNB and a 5G gNB is called Xx. The specifications of the Xn and Xx protocol are understood to be known to those of skill in the art and are hereby incorporated by reference dated as of the priority date of this application.

The present invention was described above with reference to 4G systems, however it should be appreciated that similar inventive concepts apply to 5G systems as well. For example 4G base stations could be replaced 5G nodes (gNBs) and communication via X2/Xn and S1/NG protocols. Additionally, 5G network functions (NFs) related to core network look very similar to the corresponding functions in the previous generations' core networks. The network always has to carry out some basic functions such as: communicate with the UE, store its subscription and credentials, allow access to external networks & services, provide security and manage the network access and mobility. However, new functions, not present before, which are needed to enable the new network paradigms like slicing and service-based networking.

The main 5G network functions on the core side include the following: Access and Mobility Management function (AMF), Session Management function (SMF), User plane function (UPF), Policy Control Function (PCF), Authentication Server Function (AUSF), Unified Data Management (UDM), Application Function (AF), Network Exposure function (NEF), NF Repository function (NRF), Network Slice Selection Function (NSSF). The functions performed by the MME and HNG in LTE are performed by the AMF in 5GC. Also, the 5G RAN can be used with 4G EPC via 5G NSA.

Some of the network functions are a modified, split or merged version of the conventional EPC functions (like MME, SGW, PGW, HSS & PCRF) namely, AMF, SMF, PCF, UDM, AF, UPF or AUSF, but unlike EPC functions, AMF, SMF and UPF are access independent. Additionally, there are some functions that are new, related either to the concept of slicing (i.e., NSSF), to support handling multiple slices, or to the SBA itself (i.e., NEF & NRF) to support the concept of services subscription, exposure and access.

Figure 6:
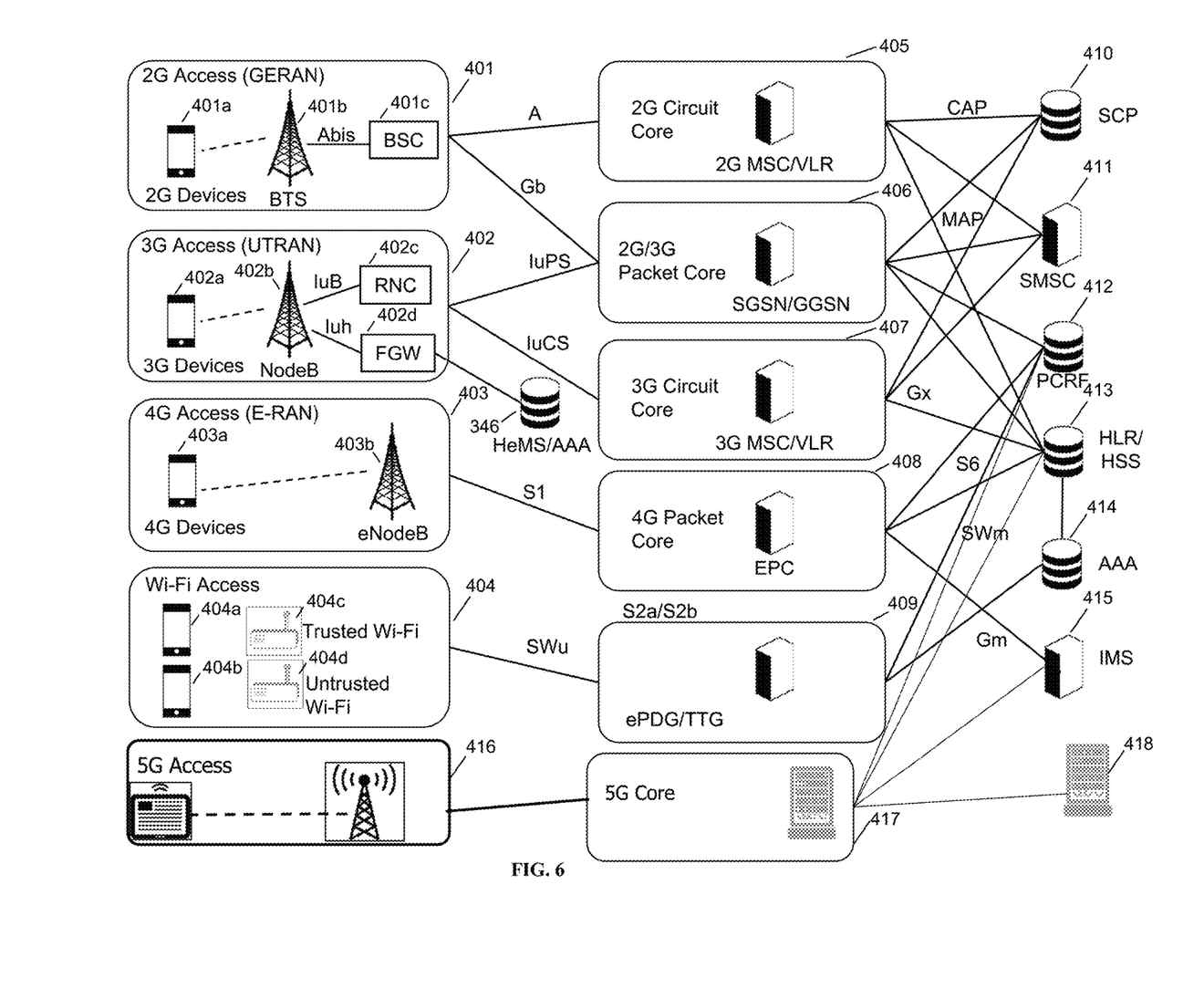
FIG. 6 is a schematic network architecture diagram for 3G and other-G prior art networks.

FIG. 6 is a schematic network architecture diagram for 3G and other-G prior art networks. The diagram shows a plurality of "Gs," including 2G, 3G, 4G, 5G and Wi-Fi. 2G is represented by GERAN 801, which includes a 2G device 601a, BTS 601b, and BSC 601c. 3G is represented by UTRAN 602, which includes a 3G UE 602a, nodeB 602b, RNC 602c, and femto gateway (FGW, which in 3GPP namespace is also known as a Home nodeB Gateway or HNBGW) 602d. 4G is represented by EUTRAN or E-RAN 603, which includes an LTE UE 603a and LTE eNodeB 603b. Wi-Fi is represented by Wi-Fi access network 604, which includes a trusted Wi-Fi access point 604c and an untrusted Wi-Fi access point 604d. The Wi-Fi devices 604a and 604b may access either AP 604c or 604d. In the current network architecture, each "G" has a core network. 2G circuit core network 605 includes a 2G MSC/VLR; 2G/3G packet core network 606 includes an SGSN/GGSN (for EDGE or UMTS packet traffic); 3G circuit core 607 includes a 3G MSC/VLR; 4G circuit core 608 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 630, the SMSC 631, PCRF 632, HLR/HSS 633, Authentication, Authorization, and Accounting server (AAA) 634, and IP Multimedia Subsystem (IMS) 635. An HeMS/AAA 636 is present in some cases for use by the 3G UTRAN. The diagram is used to indicate schematically the basic functions of each network as known to one of skill in the art, and is not intended to be exhaustive. For example, 5G core 617 is shown using a single interface to 5G access 616, although in some cases 5G access can be supported using dual connectivity or via a non-standalone deployment architecture.

Noteworthy is that the RANs 601, 602, 603, 604 and 636 rely on specialized core networks 605, 606, 607, 608, 609, 637 but share essential management databases 630, 631, 632, 633, 634, 635, 638. More specifically, for the 2G GERAN, a BSC 601c is required for Abis compatibility with BTS 601b, while for the 3G UTRAN, an RNC 602c is required for Iub compatibility and an FGW 602d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

Figure 7:
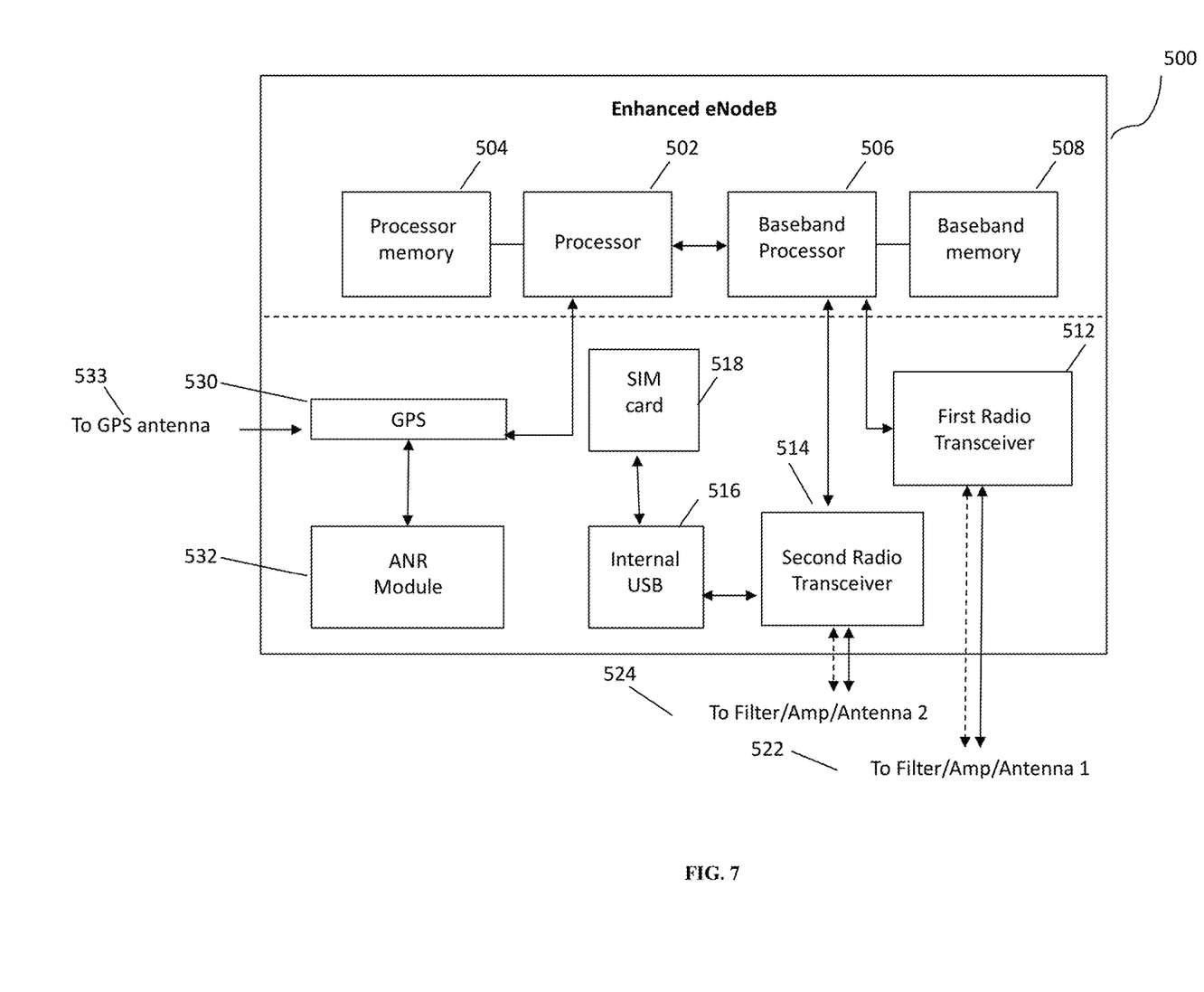
FIG. 7 is an enhanced eNodeB for performing the methods described herein, in accordance with some embodiments.

FIG. 7 is an enhanced eNodeB for performing the methods described herein, in accordance with some embodiments. Mesh network node 900 may include processor 702, processor memory 704 in communication with the processor, baseband processor 706, and baseband processor memory 708 in communication with the baseband processor. Mesh network node 700 may also include first radio transceiver 712 and second radio transceiver 714, internal universal serial bus (USB) port 716, and subscriber information module card (SIM card) 718 coupled to USB port 716. In some embodiments, the second radio transceiver 714 itself may be coupled to USB port 716, and communications from the baseband processor may be passed through USB port 716. The second radio transceiver may be used for wirelessly backhauling eNodeB 700.

Processor 702 and baseband processor 706 are in communication with one another. Processor 702 may perform routing functions, and may determine if/when a switch in network configuration is needed. Baseband processor 706 may generate and receive radio signals for both radio transceivers 712 and 714, based on instructions from processor 702. In some embodiments, processors 702 and 706 may be on the same physical logic board. In other embodiments, they may be on separate logic boards.

Processor 702 may identify the appropriate network configuration, and may perform routing of packets from one network interface to another accordingly. Processor 702 may use memory 704, in particular to store a routing table to be used for routing packets. Baseband processor 706 may perform operations to generate the radio frequency signals for transmission or retransmission by both transceivers 710 and 712. Baseband processor 706 may also perform operations to decode signals received by transceivers 712 and 714. Baseband processor 706 may use memory 708 to perform these tasks.

The first radio transceiver 712 may be a radio transceiver capable of providing LTE eNodeB functionality, and may be capable of higher power and multi-channel OFDMA. The second radio transceiver 714 may be a radio transceiver capable of providing LTE UE functionality. Both transceivers 712 and 714 may be capable of receiving and transmitting on one or more LTE bands. In some embodiments, either or both of transceivers 712 and 714 may be capable of providing both LTE eNodeB and LTE UE functionality. Transceiver 712 may be coupled to processor 702 via a Peripheral Component Interconnect-Express (PCI-E) bus, and/or via a daughtercard. As transceiver 714 is for providing LTE UE functionality, in effect emulating a user equipment, it may be connected via the same or different PCI-E bus, or by a USB bus, and may also be coupled to SIM card 718. First transceiver 712 may be coupled to first radio frequency (RF) chain (filter, amplifier, antenna) 722, and second transceiver 714 may be coupled to second RF chain (filter, amplifier, antenna) 724.

SIM card 718 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 700 is not an ordinary UE but instead is a special UE for providing backhaul to device 700.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 712 and 714, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 702 for reconfiguration.

A GPS module 730 may also be included, and may be in communication with a GPS antenna 732 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 732 may also be present and may run on processor 702 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 8:
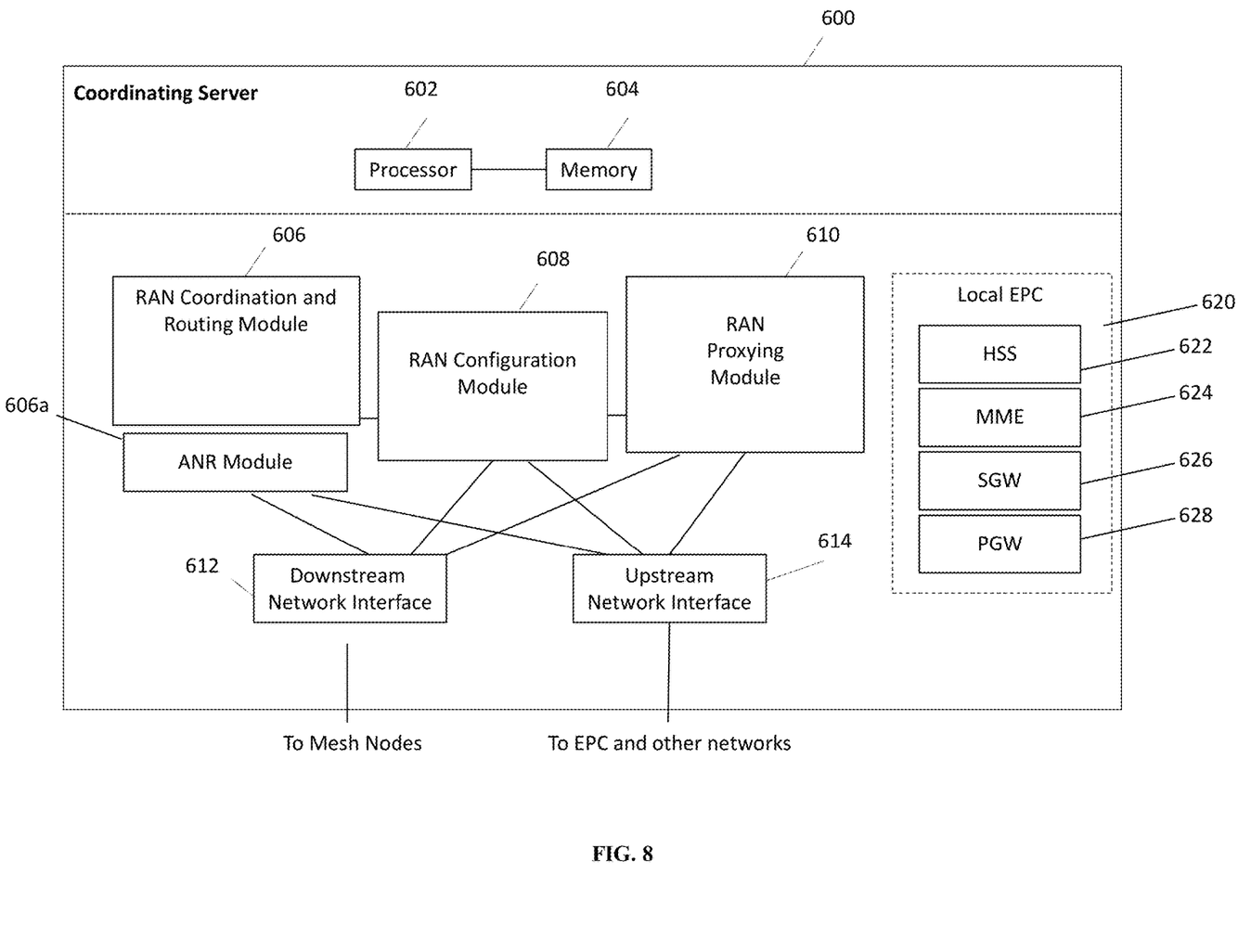
FIG. 8 is a coordinating server for providing services and performing methods as described herein, in accordance with some embodiments.

FIG. 8 is a coordinating server for providing services and performing methods as described herein, in accordance with some embodiments. Coordinating server 1000 includes processor 802 and memory 804, which are configured to provide the functions described herein. Also present are radio access network coordination/routing (RAN Coordination and routing) module 806, including ANR module 806a, RAN configuration module 808, and RAN proxying module 810. The ANR module 806a may perform the ANR tracking, PCI disambiguation, ECGI requesting, and GPS coalescing and tracking as described herein, in coordination with RAN coordination module 806 (e.g., for requesting ECGIs, etc.). In some embodiments, coordinating server 800 may coordinate multiple RANs using coordination module 806. In some embodiments, coordination server may also provide proxying, routing virtualization and RAN virtualization, via modules 810 and 808. In some embodiments, a downstream network interface 812 is provided for interfacing with the RANs, which may be a radio interface (e.g., LTE), and an upstream network interface 814 is provided for interfacing with the core network, which may be either a radio interface (e.g., LTE) or a wired interface (e.g., Ethernet).

Coordinator 800 includes local evolved packet core (EPC) module 820, for authenticating users, storing and caching priority profile information, and performing other EPC-dependent functions when no backhaul link is available. Local EPC 820 may include local HSS 822, local MME 824, local SGW 826, and local PGW 828, as well as other modules. Local EPC 820 may incorporate these modules as software modules, processes, or containers. Local EPC 820 may alternatively incorporate these modules as a small number of monolithic software processes. Modules 806, 808, 810 and local EPC 820 may each run on processor 802 or on another processor, or may be located within another device.

In 5GC, the function of the SGW is performed by the SMF and the function of the PGW is performed by the UPF. The inventors have contemplated the use of the disclosed invention in 5GC as well as 5G/NSA and 4G. As applied to 5G/NSA, certain embodiments of the present disclosure operate substantially the same as the embodiments described herein for 4G. As applied to 5GC, certain embodiments of the present disclosure operate substantially the same as the embodiments described herein for 4G, except by providing an N4 communication protocol between the SMF and UPF to provide the functions disclosed herein.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof.

The word "cell" is used herein to denote either the coverage area of any base station, or the base station itself, as appropriate and as would be understood by one having skill in the art. For purposes of the present disclosure, while actual PCIs and ECGIs have values that reflect the public land mobile networks (PLMNs) that the base stations are part of, the values are illustrative and do not reflect any PLMNs nor the actual structure of PCI and ECGI values.

In the above disclosure, it is noted that the terms PCI conflict, PCI confusion, and PCI ambiguity are used to refer to the same or similar concepts and situations, and should be understood to refer to substantially the same situation, in some embodiments. In the above disclosure, it is noted that PCI confusion detection refers to a concept separate from PCI disambiguation, and should be read separately in relation to some embodiments. Power level, as referred to above, may refer to RSSI, RSFP, or any other signal strength indication or parameter.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, 5G, legacy TDD, or other air interfaces used for mobile telephony. 5G core networks that are standalone or non-standalone have been considered by the inventors as supported by the present disclosure.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols including 5G, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, to 5G networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for optimized X2 cell reporting, comprising:
   selecting, at an X2 gateway (X2GW), a subset of virtualized BaseBand Units (vBBU) vnodes, to an X2 peer eNB that is a macro peer;
   selecting, by the X2GW while advertising neighboring cells towards the X2 peer eNB, the subset of vBBU vnodes to the macro peer that host a cell that the X2 peer eNB has reported as a neighbor; and
   advertising cells of this subset of vBBU vnodes as served-cells in X2-Setup Request/Response towards the X2 peer eNB.

2. The method of claim 1 further comprising storing, by a coordination server, virtualized cells as subsets of cells belonging to each vBBU.

3. The method of claim 2 further comprising advertising all cells of the subset of vBBU vnodes as served-cells in an X2-Setup Request/Response message towards the macro.

4. The method of claim 3 wherein subsets comprise Converged Wireless Systems (CWSs), Virtualized Radio Units (VRUs), are based on the cells that belong to a particular VRU, or are a specific set of cells identified by a macro peer.

5. The method of claim 1 further comprising selecting, by the X2GW while advertising the neighboring cells towards a macro peer, the subset of vBBU vnodes to the macro peer that have reported the X2 peer eNB as a neighbor.

6. A system providing optimized X2 cell reporting, comprising:
   a plurality of vBBUs;
   a plurality of eNodeBs (eNBs), each eNB in communication with a vBBU; and
   a coordination server in communication with the plurality of vBBUs,
   wherein a subset of virtualized BaseBand Unit (vBBU) vnodes are selected to a X2 peer eNB that is a macro peer;
   wherein the coordination server, while advertising neighboring cells towards the X2 peer eNB, selects the subset of vBBU vnodes to the macro peer that host a cell that the X2 peer eNB has reported as a neighbor; and
   wherein cells of this subset of vBBU vnodes are advertised as served-cells in X2-Setup Request/Response towards the X2 peer eNB.

7. The system of claim 6 further comprising the coordination server storing virtualized cells as subsets of cells belonging to each vBBU.

8. The system of claim 7 wherein all cells of the subset of vBBU vnodes are advertised as served-cells in an X2-Setup Request/Response message towards the X2 peer eNB.

9. The system of claim 8 wherein subsets comprise Converged Wireless Systems (CWSs), Virtualized Radio Units (VRUs), are based on the cells that belong to a particular VRU, or are a specific set of cells identified by a macro peer.

10. The system of claim 6 further comprising wherein the coordination server, while advertising the neighboring cells towards a macro peer, selects the subset of vBBU vnodes to the macro peer that have reported the X2 peer eNB as a neighbor.

11. A non-transitory computer-readable medium containing instructions for operating a wireless network system providing optimized X2 cell reporting, which, when executed, cause the system to perform steps comprising:
   selecting, at an X2 gateway (X2GW), a subset of virtualized BaseBand Units (vBBU) vnodes, to an X2 peer eNB that is a macro peer;
   selecting, by the X2GW while advertising neighboring cells towards the X2 peer eNB, the subset of vBBU vnodes to the macro peer that host a cell that the X2 peer eNB has reported as a neighbor; and
   advertising cells of this subset of vBBU vnodes as served-cells in X2-Setup Request/Response towards the X2 peer eNB.

12. The non-transitory computer-readable medium of claim 11 further comprising instructions for storing, by a coordination server, virtualized cells as subsets of cells belonging to each vBBU.

13. The non-transitory computer-readable medium of claim 11 further comprising instructions for selecting, by the X2GW while advertising the neighboring cells towards a macro peer, the subset of vBBU vnodes to the macro peer that have reported the X2 peer eNB as a neighbor.

14. The non-transitory computer-readable medium of claim 11 further comprising instructions for advertising all cells of the subset of vBBU vnodes as served-cells in an X2-Setup Request/Response message towards the macro.

15. The non-transitory computer-readable medium of claim 14 further comprising instructions wherein subsets comprise Converged Wireless Systems (CWSs), Virtualized Radio Units (VRUs), are based on the cells that belong to a particular VRU, or are a specific set of cells identified by a macro peer.

* * * * *